United States Patent
Ye et al.

(10) Patent No.: US 11,410,280 B2
(45) Date of Patent: Aug. 9, 2022

(54) SALT AND PEPPER NOISE FILTERING METHOD AND DEVICE BASED ON MORPHOLOGICAL COMPONENT ANALYSIS

(71) Applicant: Jiangxi University of Science and Technology, Ganzhou (CN)

(72) Inventors: Kuntao Ye, Ganzhou (CN); Baoyi Zhu, Ganzhou (CN); Wen Li, Ganzhou (CN); Chao Yin, Ganzhou (CN); Sheng Li, Ganzhou (CN); Guangxue Le, Ganzhou (CN)

(*) Notice: Subject to any disclaimer, the term of this patent is extended or adjusted under 35 U.S.C. 154(b) by 85 days.

(21) Appl. No.: 17/109,171

(22) Filed: Dec. 2, 2020

(65) Prior Publication Data
US 2021/0090219 A1 Mar. 25, 2021

(51) Int. Cl.
| | |
|---|---|
| *G06T 5/00* | (2006.01) |
| *G06T 7/13* | (2017.01) |
| *G06T 5/10* | (2006.01) |
| *G06T 5/20* | (2006.01) |
| *G06T 7/40* | (2017.01) |

(52) U.S. Cl.
CPC .............. *G06T 5/002* (2013.01); *G06T 5/10* (2013.01); *G06T 5/20* (2013.01); *G06T 7/13* (2017.01); *G06T 7/40* (2013.01); *G06T 2207/20036* (2013.01); *G06T 2207/20064* (2013.01); *G06T 2207/20192* (2013.01); *G06T 2207/20221* (2013.01); *G06T 2207/30168* (2013.01)

(58) Field of Classification Search
CPC combination set(s) only.
See application file for complete search history.

(56) References Cited

U.S. PATENT DOCUMENTS

| | | | |
|---|---|---|---|
| 10,964,094 B1* | 3/2021 | Passmore | G06T 17/00 |
| 2007/0110202 A1* | 5/2007 | Casler et al. | H04N 19/60 |
| | | | 375/354 |

(Continued)

OTHER PUBLICATIONS

Gonzalez-Hidalgo, Manuel, et al. "Improving salt and pepper noise removal using a fuzzy mathematical morphology-based filter." Applied Soft Computing 63 (2018): 167-180. (Year: 2018).*

(Continued)

*Primary Examiner* — Andrae S Allison

(57) ABSTRACT

The present application provides a salt and pepper noise filtering method and device based on morphological component analysis. The method comprises: obtaining a to-be-filtered image containing salt and pepper noise; calculating the dimension of the to-be-filtered image, labeled as [n, m]; initializing an n*m-dimensional all-1 labeled matrix as a salt and pepper noise labeled map; obtaining a preset region centered on a pixel point with a pixel value of 0 or 255, and calculating a noise variance between the pixel points in the preset region; labeling the position of a salt and pepper noise point in the salt and pepper noise labeled map according to the noise variance between the pixel points in the preset region, and updating and determining the salt and pepper noise labeled map. The salt and pepper noise is filtered through the method based on morphological component analysis, which improves the quality of the image.

9 Claims, 4 Drawing Sheets

(56) References Cited

U.S. PATENT DOCUMENTS

| | | | |
|---|---|---|---|
| 2008/0267530 A1* | 10/2008 | Lim | G06T 5/002 |
| | | | 382/284 |
| 2017/0094196 A1* | 3/2017 | Adsumilli | H04N 5/272 |
| 2017/0132803 A1* | 5/2017 | Zhao | G06T 7/149 |
| 2017/0178305 A1* | 6/2017 | Silver | G06T 3/403 |

OTHER PUBLICATIONS

D. Ze-Feng, Y. Zhou-Ping and X. You-Lun, "High Probability Impulse Noise-Removing Algorithm Based on Mathematical Morphology," in IEEE Signal Processing Letters, vol. 14, No. 1, pp. 31-34, Jan. 2007, doi: 10.1109/LSP.2006.881524. (Year: 2007).*

Y. Naveen and S. Gupta, "Removal of Salt and Pepper Noise Using Sparse Representation," 2012 Eighth International Conference on Signal Image Technology and Internet Based Systems, 2012, pp. 58-63, doi: 10.1109/SITIS.2012.20. (Year: 2012).*

* cited by examiner

| 123 | 33 | 14 | 25 | 45 |
| --- | --- | --- | --- | --- |
| 44 | 55 | 44 | 183 | 184 |
| 32 | 169 | 0 | 58 | 8 |
| 4 | 149 | 57 | 26 | 2 |
| 77 | 230 | 23 | 11 | 200 |
FIG. 3
FIG. 4

SALT AND PEPPER NOISE FILTERING METHOD AND DEVICE BASED ON MORPHOLOGICAL COMPONENT ANALYSIS

TECHNICAL FIELD

The present application relates to the technical field of image processing, and particularly relates to a salt and pepper noise filtering method and device based on morphological component analysis, an image mixed noise method based on morphological component analysis and an electronic device.

BACKGROUND

A digital image is easily disturbed by noise in the process of collection, transmission or output (common noise includes Gaussian noise and salt and pepper noise), causing degradation of image quality. To avoid affecting the further processing of the image such as compression, detection and restoration, it is very important to effectively filter the noise of the digital image.

Morphological component analysis (MCA) method is to select appropriate specific sub-dictionaries for different morphological components for sparse decomposition, so as to decompose the digital image into components with different features. Obviously, different parameters or denoising modes can be used for different morphological components to effectively filter the image noise. However, at present, image denoising methods based on MCA are only for Gaussian noise in the digital image. Therefore, how to filter salt and pepper noise through the image denoising method based on MCA becomes an urgent problem to be solved.

SUMMARY

The purpose of embodiments of the present application is to provide a salt and pepper noise filtering method and device based on morphological component analysis, an image mixed noise method based on morphological component analysis and an electronic device, so as to solve the problem of how to filter the salt and pepper noise through an image denoising method based on morphological component analysis.

The present invention is realized as follows:

In a first aspect, embodiments of the present application provide a salt and pepper noise filtering method based on morphological component analysis, comprising: obtaining a to-be-filtered image containing salt and pepper noise; calculating the dimension of the to-be-filtered image, labeled as [n, m]; initializing an n*m-dimensional all-1 labeled matrix as a salt and pepper noise labeled map; obtaining a preset region centered on a pixel point with a pixel value of 0 or 255, and calculating a noise variance between the pixel points in the preset region; labeling the position of a salt and pepper noise point in the salt and pepper noise labeled map according to the noise variance between the pixel points in the preset region, and updating and determining the salt and pepper noise labeled map; sparsely reconstructing the to-be-filtered image labeled with the salt and pepper noise point based on a morphological component analysis algorithm to obtain a texture component map, a smooth component map and an edge component map for filtering the salt and pepper noise; linearly fusing the texture component map, the smooth component map and the edge component map.

In the present application, through the above steps, the salt and pepper noise in the image is filtered through the method based on morphological component analysis, which improves the quality of the image and simultaneously avoids the blurring of image edges and the loss of image details.

In combination with the technical solution provided in the first aspect, in some possible implementation modes, the step of obtaining a preset region centered on a pixel point with a pixel value of 0 or 255, and calculating a noise variance between the pixel points in the preset region comprises: obtaining a 3*3 region centered on the pixel point with the pixel value of 0 or 255, and calculating the noise variance between the pixel points in the 3*3 region.

In combination with the technical solution provided in the first aspect, in some possible implementation modes, the step of labeling the position of the salt and pepper noise point in the salt and pepper noise labeled map according to the noise variance between the pixel points in the preset region, and updating and determining the salt and pepper noise labeled map comprises: judging the sizes of the noise variance between the pixel points in the preset region and a preset threshold; if the noise variance between the pixel points in the preset region is greater than or equal to the preset threshold, using the pixel point at the center in the preset region as the salt and pepper noise point and labeling the pixel point, and updating the salt and pepper noise labeled map.

In the present application, the sizes of the noise variance between the pixel points in the preset region and the preset threshold are judged, which is convenient to label the salt and pepper noise point.

In combination with the technical solution provided in the first aspect, in some possible implementation modes, the step of sparsely reconstructing the to-be-filtered image labeled with the salt and pepper noise point based on a morphological component analysis algorithm to obtain a texture component map, a smooth component map and an edge component map for filtering the salt and pepper noise comprises: initializing the parameters of the morphological component analysis algorithm, wherein the parameters comprise the number of iterations, regularization parameter, stop parameter, step length and the threshold; initializing a texture part, a smooth part and an edge part in the to-be-filtered image; when the threshold is greater than the step length, conducting the following iterative operation: keeping the smooth part and the edge part unchanged, calculating a correction value of the texture part, conducting local discrete stationary wavelet transform on the correction value of the texture part, conducting local discrete stationary wavelet transform on the correction value of the texture part, conducting soft threshold processing on a transform domain coefficient, and reconstructing the texture part through discrete stationary wavelet inverse transform; keeping the edge part and the updated texture part unchanged; calculating the correction value of the smooth part; conducting curvelet transform on the correction value of the smooth part; conducting soft threshold processing on the transform domain coefficient; reconstructing the edge part through the inverse curvelet transform; keeping the updated texture part and the updated texture part unchanged; calculating a correction value of the edge part; conducting local discrete cosine transform on the correction value of the edge part; conducting soft threshold processing on the transform domain coefficient; and reconstructing the edge part through local discrete inverse cosine transform; updating the threshold; and when the threshold is less than or equal to the step length, the texture part is the texture component map, the smooth part is the smooth component map, and the edge part is the edge component map.

In a second aspect, embodiments of the present application provide a salt and pepper noise filtering device based on morphological component analysis, comprising: an obtaining module for obtaining a to-be-filtered image containing salt and pepper noise; an initialization module for calculating the dimension of the to-be-filtered image, labeled as [n, m] and initializing an n*m-dimensional all-1 labeled matrix as a salt and pepper noise labeled map; a calculation module for obtaining a preset region centered on a pixel point with a pixel value of 0 or 255, and calculating a noise variance between the pixel points in the preset region; a labeling module for labeling the position of a salt and pepper noise point in the salt and pepper noise labeled map according to the noise variance between the pixel points in the preset region, and updating and determining the salt and pepper noise labeled map; a reconstructing module for sparsely reconstructing the to-be-filtered image labeled with the salt and pepper noise point based on a morphological component analysis algorithm to obtain a texture component map, a smooth component map and an edge component map for filtering the salt and pepper noise; and a fusing module for linearly fusing the texture component map, the smooth component map and the edge component map.

In combination with the technical solution provided in the second aspect, in some possible implementation modes, the calculation module is also used for obtaining a 3*3 region centered on the pixel point with the pixel value of 0 or 255, and calculating the noise variance between the pixel points in the 3*3 region.

In combination with the technical solution provided in the second aspect, in some possible implementation modes, the labeling module is also used for judging the sizes of the noise variance between the pixel points in the preset region and a preset threshold; if the noise variance between the pixel points in the preset region is greater than or equal to the preset threshold, using the pixel point at the center in the preset region as the salt and pepper noise point and labeling the pixel point, and updating the salt and pepper noise labeled map.

In combination with the technical solution provided in the second aspect, in some possible implementation modes, the reconstructing module is also used for initializing the parameters of the morphological component analysis algorithm, wherein the parameters comprise the number of iterations, regularization parameter, stop parameter, step length and the threshold; initializing a texture part, a smooth part and an edge part in the to-be-filtered image; when the threshold is greater than the step length, conducting the following iterative operation: keeping the smooth part and the edge part unchanged, calculating a correction value of the texture part, conducting local discrete stationary wavelet transform on the correction value of the texture part, conducting local discrete stationary wavelet transform on the correction value of the texture part, conducting soft threshold processing on a transform domain coefficient, and reconstructing the texture part through discrete stationary wavelet inverse transform; keeping the edge part and the updated texture part unchanged; calculating the correction value of the smooth part; conducting curvelet transform on the correction value of the smooth part; conducting soft threshold processing on the transform domain coefficient; reconstructing the edge part through the inverse curvelet transform; keeping the updated texture part and the updated texture part unchanged; calculating a correction value of the edge part; conducting local discrete cosine transform on the correction value of the edge part; conducting soft threshold processing on the transform domain coefficient; and reconstructing the edge part through local discrete inverse cosine transform; updating the threshold; and when the threshold is less than or equal to the step length, the texture part is the texture component map, the smooth part is the smooth component map, and the edge part is the edge component map.

In a third aspect, embodiments of the present application provide an image mixed noise filtering method based on morphological component analysis, comprising: obtaining a to-be-filtered image containing salt and pepper noise and Gaussian noise; calculating the dimension of the to-be-filtered image, labeled as [n, m]; initializing an n*m-dimensional all-1 labeled matrix as a salt and pepper noise labeled map; obtaining a preset region centered on a pixel point with a pixel value of 0 or 255, and calculating a noise variance between the pixel points in the preset region; labeling the position of a salt and pepper noise point in the salt and pepper noise labeled map according to the noise variance between the pixel points in the preset region, and updating and determining the salt and pepper noise labeled map; sparsely reconstructing the to-be-filtered image labeled with the salt and pepper noise point based on a morphological component analysis algorithm to obtain a texture component map, a smooth component map and an edge component map for filtering the salt and pepper noise; setting Gaussian filtering parameters, and respectively conducting Gaussian filtering on the texture component map and the smooth component map; obtaining a target texture component map and a target smooth component map; linearly fusing the target texture component map, the target smooth component map and the edge component map.

In the present application, through the method based on morphological component analysis and the Gaussian filtering method, the denoising of the mixed noise superimpose by Gaussian noise and salt and pepper noise is realized; the mixed noise in the image is effectively filtered; the quality of the image is improved; and the blurring of image edges and the loss of image details are simultaneously avoided.

In a fourth aspect, embodiments of the present application provide an image mixed noise filtering device based on morphological component analysis, comprising: an obtaining module for obtaining a to-be-filtered image containing salt and pepper noise and Gaussian noise; an initialization module for calculating the dimension of the to-be-filtered image, labeled as [n, m] and initializing an n*m-dimensional all-1 labeled matrix as a salt and pepper noise labeled map; a calculation module for obtaining a preset region centered on a pixel point with a pixel value of 0 or 255, and calculating a noise variance between the pixel points in the preset region; a labeling module for labeling the position of a salt and pepper noise point in the salt and pepper noise labeled map according to the noise variance between the pixel points in the preset region, and updating and determining the salt and pepper noise labeled map; a reconstructing module for sparsely reconstructing the to-be-filtered image labeled with the salt and pepper noise point based on a morphological component analysis algorithm to obtain a texture component map, a smooth component map and an edge component map for filtering the salt and pepper noise; a filtering module for setting Gaussian filtering parameters, respectively conducting Gaussian filtering on the texture component map and the smooth component map; and obtaining a target texture component map and a target smooth component map; and a fusing module for linearly fusing the target texture component map, the target smooth component map and the edge component map.

In a fifth aspect, embodiments of the present application provide an electronic device, comprising: a processor and a memory; the processor is connected with the memory; the memory is used for storing programs; the processor is used for running the programs stored in the memory, and executing the method provided by the above embodiment of the first aspect and/or some possible implementation modes in combination with the above embodiment of the first aspect or the method provided by the above embodiment of the third aspect.

In a sixth aspect, embodiments of the present application provide a storage medium which stores computer programs; and the computer programs are run by the processor to execute the method provided by the above embodiment of the first aspect and/or some possible implementation modes in combination with the above embodiment of the first aspect or the method provided by the above embodiment of the third aspect.

DESCRIPTION OF DRAWING

To more clearly describe the technical solutions in the embodiments of the present application, the drawings required to be used in embodiments of the present application will be simply presented below. It shall be understood that the following drawings only show some embodiments of the present application, and thus shall not be regarded as limitations to the scope. For those ordinary skilled in the art, other related drawings can also be obtained according to the drawings without contributing creative labor.

FIG. 3 is a schematic diagram of a preset region provided by an embodiment of the present application.

FIG. 4 shows salt and pepper noise images with different densities and corresponding result images after denoising provided by an embodiment of the present application.

Reference signs: 100—electronic device; 101—processor; 102—memory; 103—communication bus.

DETAILED DESCRIPTION

The technical solution in the embodiments of the present application will be described below in combination with the drawings in the embodiments of the present application.

At present, image denoising methods based on morphological component analysis are only for Gaussian noise in the digital image. How to filter the salt and pepper noise through the image denoising method based on morphological component analysis becomes an urgent problem to be solved.

In view of the above problems, after research and exploration, the inventors of the present application propose the following embodiments to solve the above problems.

Figure 1:
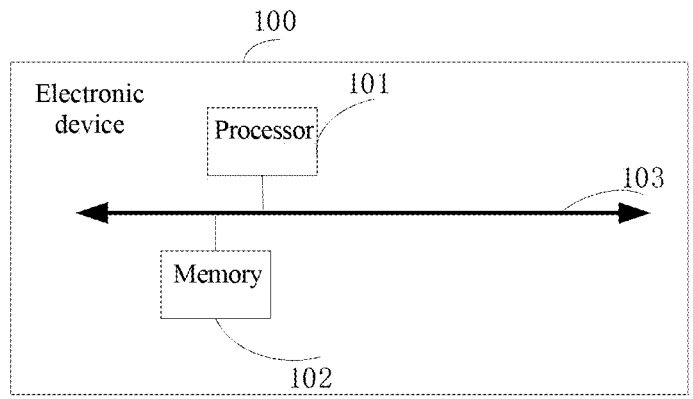
FIG. 1 is a structural schematic diagram of an electronic device provided in an embodiment of the present application.

With reference to FIG. 1, FIG. 1 is a structural schematic diagram of an electronic device 100 provided in an embodiment of the present application. In the embodiments of the present application, the electronic device 100 may be, but not limited to, a computer, a smart phone, a tablet personal computer, a personal digital assistant (PAD), a mobile Internet device (MID), and the like.

Structurally, the electronic device 100 comprises at least one processor 101, at least one memory 102 and at least one communication bus 103. The communication bus 103 is used for realizing communication between the processor 101 and the memory 102. The processor 101 is used for obtaining a to-be-filtered image containing salt and pepper noise; calculating the dimension of the to-be-filtered image, labeled as [n, m]; initializing an n*m-dimensional all-1 labeled matrix as a salt and pepper noise labeled map; obtaining a preset region centered on a pixel point with a pixel value of 0 or 255, and calculating a noise variance between the pixel points in the preset region; labeling the position of a salt and pepper noise point in the salt and pepper noise labeled map according to the noise variance between the pixel points in the preset region, and updating and determining the salt and pepper noise labeled map; sparsely reconstructing the to-be-filtered image labeled with the salt and pepper noise point based on a morphological component analysis algorithm to obtain a texture component map, a smooth component map and an edge component map for filtering the salt and pepper noise; linearly fusing the texture component map, the smooth component map and the edge component map. The processor 101 is also used for obtaining a to-be-filtered image containing salt and pepper noise and Gaussian noise; calculating the dimension of the to-be-filtered image, labeled as [n, m]; initializing an n*m-dimensional all-1 labeled matrix as a salt and pepper noise labeled map; obtaining a preset region centered on a pixel point with a pixel value of 0 or 255, and calculating a noise variance between the pixel points in the preset region; labeling the position of a salt and pepper noise point in the salt and pepper noise labeled map according to the noise variance between the pixel points in the preset region, and updating and determining the salt and pepper noise labeled map; sparsely reconstructing the to-be-filtered image labeled with the salt and pepper noise point based on a morphological component analysis algorithm to obtain a texture component map, a smooth component map and an edge component map for filtering the salt and pepper noise; setting Gaussian filtering parameters, and respectively conducting Gaussian filtering on the texture component map and the smooth component map; obtaining a target texture component map and a target smooth component map; linearly fusing the target texture component map, the target smooth component map and the edge component map.

The processor 101 may be an integrated circuit chip with signal processing capability. The processor 101 may also be a general-purpose processor, such as a digital signal processor (DSP), an application specific integrated circuit (ASIC), a discrete gate or transistor logic device and a discrete hardware component to realize or execute the methods, steps and logic block diagrams disclosed in the embodiments of the present application. In addition, the general-purpose processor may be a microprocessor or any conventional processor.

The memory 102 may be, but not limited to, random access memory (RAM), read only memory (ROM), programmable read-only memory (PROM), erasable programmable read-only memory (EPROM), and electric erasable programmable read-only memory (EEPROM). The memory

102 is used for storing a program. After receiving an execution instruction, the processor 101 executes the program.

It should be understood that the structure shown in FIG. 1 is only illustrative. The electronic device 100 provided by the embodiment of the present application may also have fewer or more components than those shown in FIG. 1, or have a different configuration from that shown in FIG. 1. In addition, each component shown in FIG. 1 can be realized by software, hardware or a combination thereof.

Figure 2:
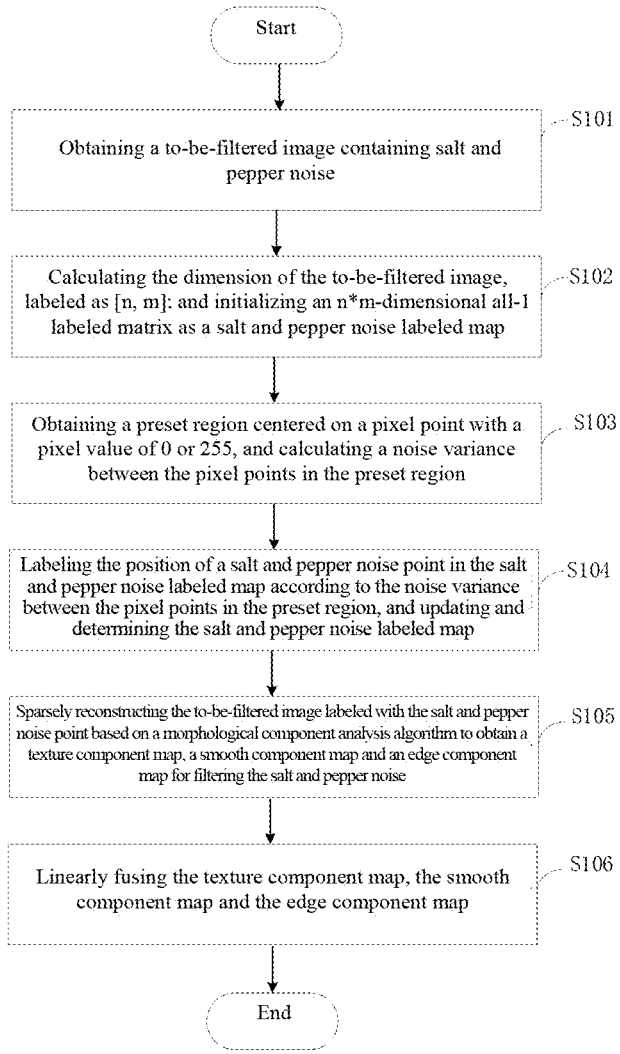
FIG. 2 is a step flow chart of a salt and pepper noise filtering method based on morphological component analysis provided by an embodiment of the present application.

With reference to FIG. 2, embodiments of the present application provide a salt and pepper noise filtering method based on morphological component analysis. The method is applied to the electronic device 100 shown in FIG. 1. The specific process and steps of the method will be described below with reference to FIG. 2. The method comprises: step S101-step S106.

Step S101: obtaining a to-be-filtered image containing salt and pepper noise.

Firstly, reading a to-be-filtered image containing salt and pepper noise, and using a symbol I to indicate the to-be-filtered image.

Step S102: calculating the dimension of the to-be-filtered image, labeled as [n, m]; and initializing an n*m-dimensional all-1 labeled matrix as a salt and pepper noise labeled map.

Initializing the to-be-filtered image I. The step of initializing the to-be-filtered image comprises: calculating the dimension of the to-be-filtered image I, labeled as [n, m]; and initializing the to-be-filtered image as an n*m-dimensional all-I labeled matrix. It should be noted that the dimension of the to-be-filtered image I represents the size of the image, and is often expressed as "width*height", such as 800 (width)*600 (height); n represents width, and m represents height. The to-be-filtered image is initialized as an n*m-dimensional all-1 labeled matrix as an initial salt and pepper noise labeled map Mask, which indicates that each n*m-dimensional pixel point is labeled as 1.

Step S103: obtaining a preset region centered on a pixel point with a pixel value of 0 or 255, and calculating a noise variance between the pixel points in the preset region.

The preset region centered on the pixel point with a pixel value of 0 or 255 is obtained, and the noise variance between the pixel points in the preset region is calculated. It should be noted that the above pixel value can be understood as the gray value of the pixel point. The gray value generally ranges from 0 to 255; the gray value 0 indicates black, and the gray value 255 indicates white. The pixel point with a gray value of 0 or 255 is most likely to be the salt and pepper noise point. Therefore, in the embodiment of the present application, a preset region centered on the pixel point with the pixel value of 0 or 255 is obtained.

Optionally, the step of obtaining the preset region centered on the pixel point with the pixel value of 0 or 255, and calculating the noise variance between the pixel points in the preset region may be a step of obtaining a 3*3 region centered on the pixel point with the pixel value of 0 or 255, and calculating the noise variance between the pixel points in the 3*3 region.

It should be noted that the 3*3 region centered on the pixel point with the pixel value of 0 or 255 indicates that the region has 9 pixel points. The center of the 9 pixel points is a pixel point with a pixel value of 0 or 255, as shown in FIG. 3. The region enclosed by a dashed box is the preset region (that is, the 3*3 region); and eight pixel points exist around the pixel point with the pixel value of 0. The 3*3 region on the pixel point is used as the preset region, and the noise variance between the pixel points in the 3*3 region is calculated. It should be noted that the mean noise variance of all the pixel points in the 3*3 region is calculated, instead of respectively calculating the noise variance between every two pixel points. A calculating formula of the noise variance between the pixel points in the 3*3 region is:

$$\text{means} = \frac{1}{9}\sum I(i, j); \delta = \frac{1}{9}\sum (I(i, j) - \text{means})^2;$$

I(i,j) represents a pixel value of a pixel point in a coordinate position (i,j) in the 3*3 region; means represents a mean value of the pixel values of all the pixel points in the 3*3 region; and δ represents the noise variance.

The mean noise variance of the 9 points can be calculated through the above formula.

Optionally, in other embodiments, the step of obtaining the preset region centered on the pixel point with the pixel value of 0 or 255, and calculating the noise variance between the pixel points in the preset region may be a step of obtaining a 5*5 region centered on the pixel point with the pixel value of 0 or 255, and calculating the noise variance between the pixel points in the 5*5 region.

The 5*5 region centered on the pixel point with the pixel value of 0 or 255 indicates that the region has 25 pixel points. The center of the 25 pixel points is a pixel point with a pixel value of 0 or 255. A calculating formula of the noise variance between the pixel points in the 5*5 region is:

$$\text{means} = \frac{1}{25}\Sigma I(i, j); \delta = \frac{1}{25}\Sigma (I(i, j) - \text{means})^2;$$

I(i,j) represents a pixel value of a pixel point in a coordinate position (i,j) in the 5*5 region; means represents a mean value of the pixel values of all the pixel points in the 5*5 region; and δ represents the noise variance.

It should be noted that the preset region may be determined according to actual conditions. For example, the preset region may also be a 7*7 region centered on a pixel with a pixel value of 0 or 255, which is not limited in the present application.

Step S104: labeling the position of a salt and pepper noise point in the salt and pepper noise labeled map according to the noise variance between the pixel points in the preset region, and updating and determining the salt and pepper noise labeled map.

Optionally, labeling is conducted in the following way: firstly, the sizes of the noise variance between the pixel points in the preset region and the preset threshold are judged; if the noise variance between the pixel points in the preset region is greater than or equal to the preset threshold, it indicates that the pixel point of 0 or 255 is quite different from the surrounding pixel points; the pixel point of 0 or 255 is an isolated pixel point; and the pixel point of 0 or 255 in the region is very likely to be salt and pepper noise point; and then the pixel point is labeled. If the noise variance between the pixel points in the preset region is smaller than the preset threshold, it indicates that the pixel point of 0 or 255 is slightly different from the surrounding pixel points; the pixel point of 0 or 255 is not an isolated pixel point; and at this moment, the pixel point is not treated.

The preset threshold can be determined according to actual conditions. For example, the preset threshold may be 100, 500, 1000, 1500 or 2000, which is not limited in the present application.

In the present embodiment, the preset threshold is 100, and can be accordingly judged according to the following formula:

$$F(i, j) = \begin{cases} F(i, j), & \delta < 100 \\ 0, & \delta \geq 100 \end{cases}$$

$F(i,j)$ represents the pixel point in the preset region; and $\delta$ represents the noise variance in the preset region calculated in the above step S103.

Optionally, labeling can also be conducted in the following way: in step S103, the 3*3 region centered on the pixel point with the pixel value of 0 or 255 and the 5*5 region centered on the pixel point with the pixel value of 0 or 255 are respectively obtained; then the noise variance between the pixel points in all the 3*3 regions and the noise variance between the pixel points in all the 5*5 regions are respectively calculated; then a value obtained by subtracting the noise variance of the 3*3 region from the noise variance of each 5*5 region centered on the pixel point of 0 or 255 is calculated; if the value is greater than a preset value, it indicates that the pixel point of 0 or 255 in the region is very likely to be the salt and pepper noise point; and then the pixel point is labeled. If the value is smaller than the preset value, the pixel point is not treated.

It should be understood that the specific mode to label the salt and pepper noise point is not limited in the present application.

Step S105: sparsely reconstructing the to-be-filtered image labeled with the salt and pepper noise point based on a morphological component analysis algorithm to obtain a texture component map, a smooth component map and an edge component map for filtering the salt and pepper noise.

The inventors have found in the research that in the sparse decomposition process of the morphological component analysis algorithm, if the position of an abnormal point (such as the salt and pepper noise point) in the image is labeled in advance and the image labeled with the abnormal point is sparsely decomposed and reconstructed, then the abnormal point of the image can be repaired. Therefore, in the present application, the characteristics of the morphological component analysis algorithm are fully used to sparsely reconstruct the to-be-filtered image labeled with the salt and pepper noise point in the above step.

Optionally, the above step S105 of sparsely reconstructing the to-be-filtered image labeled with the salt and pepper noise point based on the morphological component analysis algorithm to obtain a texture component map, a smooth component map and an edge component map for filtering the salt and pepper noise may comprise: step S201-step S203.

Step S201: initializing the parameters of the morphological component analysis algorithm.

Firstly, initializing the parameters in the morphological component analysis algorithm, setting the number of iterations itermax=200, regularization parameter $\eta=0.5$, stop parameter $\varepsilon=10^{-6}$ and step length $\lambda=(\sigma-\varepsilon)/(\text{itermax}-1)$, wherein $\sigma$ represents the threshold, and $\sigma$ is specifically a maximum length of an image coefficient vector in a corresponding dictionary; using the salt and pepper noise labeled map Mask to treat the to-be-filtered image containing the salt and pepper noise to obtain the to-be-filtered image IMG_H labeled with the salt and pepper noise point, which is specifically processed by the following formula, IMG_H=Mask*I; I is the to-be-filtered image containing the salt and pepper noise obtained in step S101.

Step S202: initializing a texture part, a smooth part and an edge part in the to-be-filtered image.

Initializing the texture part, the smooth part and the edge part in the to-be-filtered image means initializing the texture part $y_t$=IMG_H, the smooth part $y_s$=0 and the edge part $y_e$=0.

Step S203: when the threshold is greater than the step length, conducting the following iterative operation:

Keeping the smooth part $y_s$=0 and the edge part $y_e$=0, and calculating the correction value of the texture part $y_t$, wherein the calculation formula of the correction value is $R_t=y_t+\text{Residual}_t$; $\text{Residual}_t=(\text{IMG\_H}-y_e-y_s-y_t)*\text{Mask}$; wherein $R_t$ represents the correction value of the texture part, and $\text{Residual}_t$ represents the residual of the texture part. Then, conducting local discrete stationary wavelet transform on the correction value $R_t$, conducting soft threshold processing on a transform domain coefficient, and reconstructing the texture part through discrete stationary wavelet inverse transform.

Keeping the updated texture part $y_t$ unchanged and the edge part $y_e$=0, and calculating the correction value of the smooth part $y_s$, wherein the calculation formula of the correction value is $R_s=y_s+\text{Residual}_s$; $\text{Residual}_s=(\text{IMG\_H}-y_e-y_s-y_t)*\text{Mask}$; wherein $R_s$ represents the correction value of the smooth part, and $\text{Residual}_s$ represents the residual of the smooth part. Then, conducting curvelet transform on the correction value $R_s$; conducting soft threshold processing on the transform domain coefficient; and reconstructing the edge part through the inverse curvelet transform.

Keeping the updated texture part $y_t$ and the updated smooth part $y_s$ unchanged, and calculating the correction value of the edge part $y_e$, wherein the calculation formula of the correction value is $R_e=y_e+\text{Residual}_e$; $\text{Residual}_e=(\text{IMG\_H}-y_e-y_s-y_t)*\text{Mask}$, wherein $R_e$ represents the correction value of the edge part, and $\text{Residual}_e$ represents the residual of the edge part. Then, conducting local discrete cosine transform on the correction value $R_e$; conducting soft threshold processing on the transform domain coefficient; and reconstructing the edge part through local discrete inverse cosine transform.

Updating the threshold $\sigma=\sigma-\lambda$; and when the threshold is less than or equal to the step length, the texture part is the texture component map, the smooth part is the smooth component map, and the edge part is the edge component map.

Step S106: linearly fusing the texture component map, the smooth component map and the edge component map.

After the edge component map, the texture component map and the smooth component map are obtained through the above step S203, the edge component map, the texture component map and the smooth component map are linearly merged, that is, the edge component map, the texture component map, and the smooth component map are added to obtain the image after filtering the salt and pepper noise.

In conclusion, in the embodiments of the present application, the to-be-filtered image containing salt and pepper noise is obtained, and then initialized; the preset region centered on the pixel point with the pixel value of 0 or 255 is obtained, and the noise variance between the pixel points in the preset region is calculated; then, the position of the salt and pepper noise point is labeled in the salt and pepper noise labeled map according to the noise variance between the pixel points in the preset region, and the salt and pepper noise labeled map is updated and determined; the to-be-filtered image labeled with the salt and pepper noise point is sparsely reconstructed based on a morphological component analysis algorithm to obtain a texture component map, a smooth component map and an edge component map for filtering the salt and pepper noise; and finally, the edge component map, the texture component map and the smooth component map are linearly fused, thereby filtering the salt and pepper noise in the image through the method based on morphological component analysis, improving the quality of the image and simultaneously avoiding the blurring of image edges and the loss of image details.

With reference to FIG. 4, FIG. 4 shows salt and pepper noise images with different densities and corresponding result images after denoising provided by an embodiment of the present application.

a11 is the salt and pepper noise map with a density of 0.01; and a12 is the image after denoising processing by the above method. a21 is the salt and pepper noise map with a density of 0.03; and a22 is the image after denoising processing by the above method. a31 is the salt and pepper noise map with a density of 0.05; and a32 is the image after denoising processing by the above method.

The above embodiments describe how to filter the salt and pepper noise through the method based on morphological component analysis. However, the inventors have found in the exploration that the digital image is often affected by multiple types of noise, so a method which can filter the mixed noise superposed by the Gaussian noise and the salt and pepper noise has wide needs.

Figure 5:
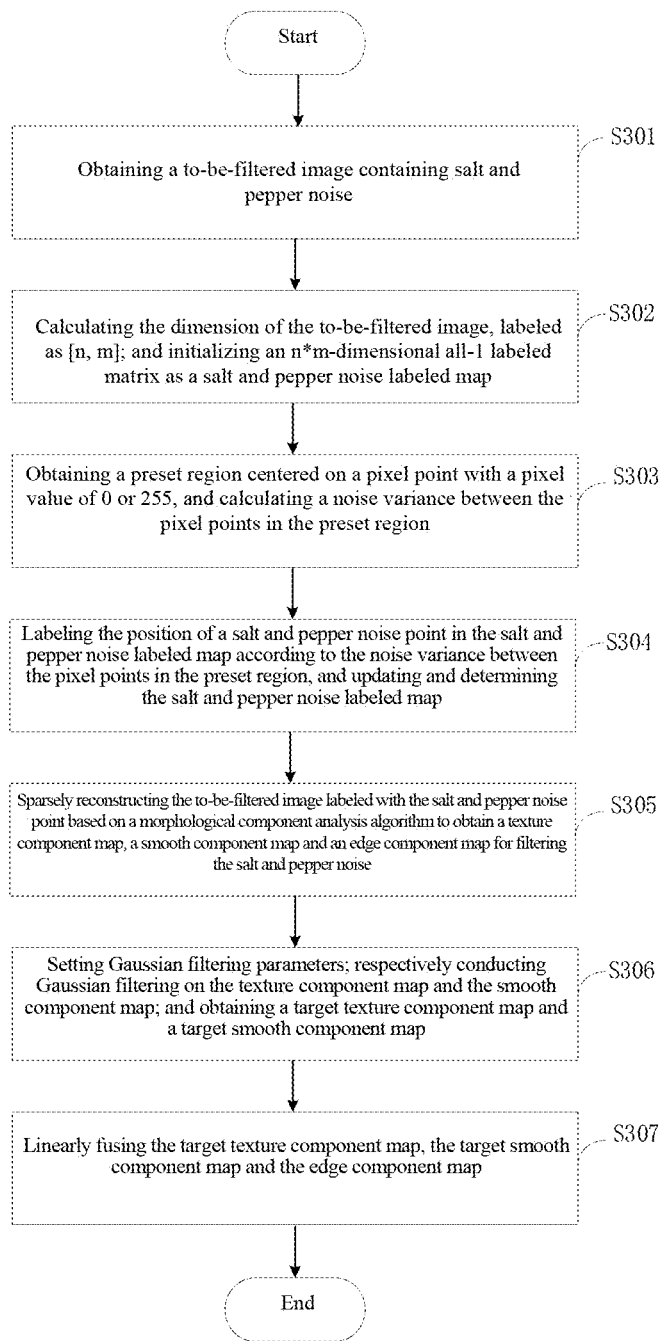
FIG. 5 is a step flow chart of an image mixed noise filtering method based on morphological component analysis provided by an embodiment of the present application.

In view of the above problems and based on the same inventive concept, embodiments of the present application also provide an image mixed noise filtering method based on morphological component analysis. The method is also applied to the electronic device 100 shown in FIG. 1. The specific process and steps of the method will be described below with reference to FIG. 5. The method comprises: step S301-step S307.

Step S301: obtaining a to-be-filtered image containing salt and pepper noise and Gaussian noise.

Firstly, reading a to-be-filtered image containing salt and pepper noise and Gaussian noise, and using a symbol I to indicate the to-be-filtered image.

Step S302: calculating the dimension of the to-be-filtered image, labeled as [n, m]; and initializing an n*m-dimensional all-1 labeled matrix as a salt and pepper noise labeled map.

Step S303: obtaining a preset region centered on a pixel point with a pixel value of 0 or 255, and calculating a noise variance between the pixel points in the preset region.

Step S304: labeling the position of a salt and pepper noise point in the salt and pepper noise labeled map according to the noise variance between the pixel points in the preset region, and updating and determining the salt and pepper noise labeled map.

Step S305: sparsely reconstructing the to-be-filtered image labeled with the salt and pepper noise point based on a morphological component analysis algorithm to obtain a texture component map, a smooth component map and an edge component map for filtering the salt and pepper noise.

It should be noted that the above step S302-step S305 are used to filter the salt and pepper noise in the to-be-filtered image, and the principle is basically the same as that described in step S102-step S105. Therefore, to avoid redundancy, no illustration is made herein.

Step S306: setting Gaussian filtering parameters; respectively conducting Gaussian filtering on the texture component map and the smooth component map; and obtaining a target texture component map and a target smooth component map.

Specifically, the standard deviation sigma of a Gaussian filter is initialized as 1, and a Gaussian distribution value in the preset region is calculated. It should be noted that the preset region is the preset region in step S303. For example, in step S303, the 3*3 region centered on the pixel point with the pixel value of 0 or 255 is obtained. In the step, the Gaussian distribution value in the 3*3 region centered on the pixel point with a pixel value of 0 or 255 is calculated. A specific calculating formula is $$G(x, y) = \frac{1}{2\pi * sigma^2} e^{-\frac{x^2+y^2}{2sigma^2}},$$

wherein G(x,y) represents the Gaussian distribution value, and x and y represent the coordinate position of the pixel point.

After the Gaussian filtering parameters are set, Gaussian filtering is conducted respectively on the texture component map and the smooth component map to obtain the target texture component map and the target smooth component map.

Step S307: linearly fusing the target texture component map, the target smooth component map and the edge component map.

Finally, the obtained target texture component map, target smooth component map, and edge component map are linearly fused, that is, the target texture component map, the target smooth component map and the edge component map are added to obtain the final image without the salt and pepper noise and Gaussian noise.

In the embodiments of the present application, through the method based on morphological component analysis, the denoising of the mixed noise superimpose by Gaussian noise and salt and pepper noise is realized; the mixed noise in the image is effectively filtered; the quality of the image is improved; and the blurring of image edges and the loss of image details are simultaneously avoided.

Figure 6:
FIG. 6 shows mixed noise images with different proportions and corresponding result images after denoising provided by an embodiment of the present application.

With reference to FIG. 6, FIG. 6 shows mixed noise images with different proportions and corresponding result images after denoising provided by an embodiment of the present application.

a1 is the mixed noise map containing salt and pepper noise (with a density of 0.01) and Gaussian noise (with a mean value of 0 and variance of 10); and a2 is the image after denoising processing by the above method. b1 is the mixed noise map containing salt and pepper noise (with a density of 0.03) and Gaussian noise (with a mean value of 0 and variance of 10); and b2 is the image after denoising processing by the above method. c1 is the mixed noise map containing salt and pepper noise (with a density of 0.05) and Gaussian noise (with a mean value of 0 and variance of 10); and c2 is the image after denoising processing by the above method. d1 is the mixed noise map containing salt and pepper noise (with a density of 0.01) and Gaussian noise (with a mean value of 0 and variance of 20); and d2 is the image after denoising processing by the above method. e1 is the mixed noise map containing salt and pepper noise (with a density of 0.03) and Gaussian noise (with a mean value of 0 and variance of 20); and e2 is the image after denoising processing by the above method. f1 is the mixed noise map containing salt and pepper noise (with a density of 0.05) and Gaussian noise (with a mean value of 0 and variance of 20); and f2 is the image after denoising processing by the above method.

Based on the same inventive concept, embodiments of the present application also provide a salt and pepper noise filtering device based on morphological component analysis, comprising: an obtaining module for obtaining a to-be-filtered image containing salt and pepper noise; an initialization module for calculating the dimension of the to-be-filtered image, labeled as [n, m] and initializing an n*m-dimensional all-1 labeled matrix as a salt and pepper noise labeled map; a calculation module for obtaining a preset region centered on a pixel point with a pixel value of 0 or 255, and calculating a noise variance between the pixel points in the preset region; a labeling module for labeling the position of a salt and pepper noise point in the salt and pepper noise labeled map according to the noise variance between the pixel points in the preset region, and updating and determining the salt and pepper noise labeled map; a reconstructing module for sparsely reconstructing the to-be-filtered image labeled with the salt and pepper noise point based on a morphological component analysis algorithm to obtain a texture component map, a smooth component map and an edge component map for filtering the salt and pepper noise; and a fusing module for linearly fusing the texture component map, the smooth component map and the edge component map.

Optionally, the calculation module is also used for obtaining a 3*3 region centered on the pixel point with the pixel value of 0 or 255, and calculating the noise variance between the pixel points in the 3*3 region.

Optionally, the labeling module is also used for judging the sizes of the noise variance between the pixel points in the preset region and a preset threshold; if the noise variance between the pixel points in the preset region is greater than or equal to the preset threshold, using the pixel point at the center in the preset region as the salt and pepper noise point and labeling the pixel point, and updating the salt and pepper noise labeled map.

Optionally, the reconstructing module is also used for initializing the parameters of the morphological component analysis algorithm, wherein the parameters comprise the number of iterations, regularization parameter, stop parameter, step length and the threshold; initializing a texture part, a smooth part and an edge part in the to-be-filtered image; when the threshold is greater than the step length, conducting the following iterative operation: keeping the smooth part and the edge part unchanged, calculating a correction value of the texture part, conducting local discrete stationary wavelet transform on the correction value of the texture part, conducting local discrete stationary wavelet transform on the correction value of the texture part, conducting soft threshold processing on a transform domain coefficient, and reconstructing the texture part through discrete stationary wavelet inverse transform; keeping the edge part and the updated texture part unchanged; calculating the correction value of the smooth part; conducting curvelet transform on the correction value of the smooth part; conducting soft threshold processing on the transform domain coefficient; reconstructing the edge part through the inverse curvelet transform; keeping the updated texture part and the updated texture part unchanged; calculating a correction value of the edge part; conducting local discrete cosine transform on the correction value of the edge part; conducting soft threshold processing on the transform domain coefficient; and reconstructing the edge part through local discrete inverse cosine transform; updating the threshold; and when the threshold is less than or equal to the step length, the texture part is the texture component map, the smooth part is the smooth component map, and the edge part is the edge component map.

Based on the same inventive concept, embodiments of the present application also provide an image mixed noise filtering device based on morphological component analysis, comprising: an obtaining module for obtaining a to-be-filtered image containing salt and pepper noise and Gaussian noise; an initialization module for calculating the dimension of the to-be-filtered image, labeled as [n, m] and initializing an n*m-dimensional all-1 labeled matrix as a salt and pepper noise labeled map; a calculation module for obtaining a preset region centered on a pixel point with a pixel value of 0 or 255, and calculating a noise variance between the pixel points in the preset region; a labeling module for labeling the position of a salt and pepper noise point in the salt and pepper noise labeled map according to the noise variance between the pixel points in the preset region, and updating and determining the salt and pepper noise labeled map; a reconstructing module for sparsely reconstructing the to-be-filtered image labeled with the salt and pepper noise point based on a morphological component analysis algorithm to obtain a texture component map, a smooth component map and an edge component map for filtering the salt and pepper noise; a filtering module for setting Gaussian filtering parameters, respectively conducting Gaussian filtering on the texture component map and the smooth component map; and obtaining a target texture component map and a target smooth component map; and a fusing module for linearly fusing the target texture component map, the target smooth component map and the edge component map.

Based on the same inventive concept, embodiments of the present invention also provide a storage medium in which a computer program is stored; and the computer program is run to execute the method provided by the above embodiments.

The storage medium may be any available medium which can be accessed by a computer or a data storage device, such as a server and a data center, containing one or more integrated available media. The available medium may be a magnetic medium (such as a floppy disk, a hard disk and a magnetic tape), an optical medium (such as DVD), or a semiconductor medium (such as a solid state disk (SSD)).

In the embodiments provided in the present application, it should be understood that the disclosed device and method can be realized in other modes. The device embodiment described above is only illustrative; for example, division of the units is only logical function division, and an additional division mode may exist during actual implementation; for example, a plurality of units or assemblies can be combined or can be integrated in another system, or some features can be neglected or cannot be executed. In addition, coupling or direct coupling or communication connection between displayed or discussed components may be indirect coupling or communication connection through a plurality of interfaces, devices or units, and may be in a form of electrical connection, mechanical connection or other connections.

The units described as separated components may be or may not be separated physically, and components displayed as units may be or may not be physical units, that is, the components can be located at one place or can be distributed on a plurality of network units. The purpose of the solution of the embodiments can be achieved by selecting some or all units according to actual needs.

Moreover, the functional modules in the embodiments of the present application may be integrated together to form an independent part, or each module may exist separately, or two or more modules may be integrated to form an independent part.

Relationship terms of "first", "second" and the like herein are just used for differentiating one entity or operation from the other entity or operation, and do not necessarily require or imply any practical relationship or sequence between the entities or operations.

The above only describes the embodiments of the present application and is not intended to limit the protection scope of the present application. For those skilled in the art, various variations and changes can be made to the present application. Any modification, equivalent replacement, improvement, etc. made within the spirit and the principle of the present application shall be included within the protection scope of the present application.

The invention claimed is:

1. A salt and pepper noise filtering method based on morphological component analysis, comprising:
    obtaining a to-be-filtered image containing salt and pepper noise;
    calculating the dimension of the to-be-filtered image, labeled as [n, m];
    initializing an n*m-dimensional all-1 labeled matrix as a salt and pepper noise labeled map;
    obtaining a preset region centered on a pixel point with a pixel value of 0 or 255, and calculating a noise variance between the pixel points in the preset region;
    labeling the position of a salt and pepper noise point in the salt and pepper noise labeled map according to the noise variance between the pixel points in the preset region, and updating and determining the salt and pepper noise labeled map;
    sparsely reconstructing the to-be-filtered image labeled with the salt and pepper noise point based on a morphological component analysis algorithm to obtain a texture component map, a smooth component map and an edge component map for filtering the salt and pepper noise;
    linearly fusing the texture component map, the smooth component map and the edge component map.

2. The method according to claim 1, wherein the step of obtaining a preset region centered on a pixel point with a pixel value of 0 or 255, and calculating a noise variance between the pixel points in the preset region comprises:
    obtaining a 3*3 region centered on the pixel point with the pixel value of 0 or 255, and calculating the noise variance between the pixel points in the 3*3 region.

3. The method according to claim 1, wherein the step of labeling the position of the salt and pepper noise point in the salt and pepper noise labeled map according to the noise variance between the pixel points in the preset region, and updating and determining the salt and pepper noise labeled map comprises:
    judging the sizes of the noise variance between the pixel points in the preset region and a preset threshold;
    if the noise variance between the pixel points in the preset region is greater than or equal to the preset threshold, using the pixel point at the center in the preset region as the salt and pepper noise point and labeling the pixel point, and updating the salt and pepper noise labeled map.

4. The method according to claim 1, wherein the step of sparsely reconstructing the to-be-filtered image labeled with the salt and pepper noise point based on a morphological component analysis algorithm to obtain a texture component map, a smooth component map and an edge component map for filtering the salt and pepper noise comprises:
    initializing the parameters of the morphological component analysis algorithm, wherein the parameters comprise the number of iterations, regularization parameter, stop parameter, step length and the threshold;
    initializing a texture part, a smooth part and an edge part in the to-be-filtered image;
    when the threshold is greater than the step length, conducting the following iterative operation: keeping the smooth part and the edge part unchanged, calculating a correction value of the texture part, conducting local discrete stationary wavelet transform on the correction value of the texture part, conducting local discrete stationary wavelet transform on the correction value of the texture part, conducting soft threshold processing on a transform domain coefficient, and reconstructing the texture part through discrete stationary wavelet inverse transform; keeping the edge part and the updated texture part unchanged; calculating the correction value of the smooth part; conducting curvelet transform on the correction value of the smooth part; conducting soft threshold processing on the transform domain coefficient; reconstructing the edge part through the inverse curvelet transform; keeping the updated texture part and the updated texture part unchanged; calculating a correction value of the edge part; conducting local discrete cosine transform on the correction value of the edge part; conducting soft threshold processing on the transform domain coefficient; and reconstructing the edge part through local discrete inverse cosine transform; updating the threshold; and when the threshold is less than or equal to the step length, the texture part is the texture component map, the smooth part is the smooth component map, and the edge part is the edge component map.

5. A salt and pepper noise filtering device based on morphological component analysis, comprising:
    an obtaining module for obtaining a to-be-filtered image containing salt and pepper noise;
    an initialization module for calculating the dimension of the to-be-filtered image, labeled as [n, m]; initializing an n*m-dimensional all-1 labeled matrix as a salt and pepper noise labeled map;
    a calculation module for obtaining a preset region centered on a pixel point with a pixel value of 0 or 255, and calculating a noise variance between the pixel points in the preset region;
    a labeling module for labeling the position of a salt and pepper noise point in the salt and pepper noise labeled map according to the noise variance between the pixel points in the preset region, and updating and determining the salt and pepper noise labeled map;
    a reconstructing module for sparsely reconstructing the to-be-filtered image labeled with the salt and pepper noise point based on a morphological component analysis algorithm to obtain a texture component map, a smooth component map and an edge component map for filtering the salt and pepper noise; and
    a fusing module for linearly fusing the texture component map, the smooth component map and the edge component map.

6. The device according to claim 5, wherein the calculation module is also used for obtaining a 3*3 region centered on the pixel point with the pixel value of 0 or 255, and calculating the noise variance between the pixel points in the 3*3 region.

7. The device according to claim 5, wherein the labeling module is also used for judging the sizes of the noise variance between the pixel points in the preset region and a preset threshold; if the noise variance between the pixel points in the preset region is greater than or equal to the preset threshold, using the pixel point at the center in the preset region as the salt and pepper noise point and labeling the pixel point, and updating the salt and pepper noise labeled map.

8. The method according to claim 5, wherein the reconstructing module is also used for initializing the parameters of the morphological component analysis algorithm, wherein the parameters comprise the number of iterations, regularization parameter, stop parameter, step length and the threshold; initializing a texture part, a smooth part and an edge part in the to-be-filtered image; when the threshold is greater than the step length, conducting the following iterative operation: keeping the smooth part and the edge part unchanged, calculating a correction value of the texture part, conducting local discrete stationary wavelet transform on the correction value of the texture part, conducting local discrete stationary wavelet transform on the correction value of the texture part, conducting soft threshold processing on a transform domain coefficient, and reconstructing the texture part through discrete stationary wavelet inverse transform; keeping the edge part and the updated texture part unchanged; calculating the correction value of the smooth part; conducting curvelet transform on the correction value of the smooth part; conducting soft threshold processing on the transform domain coefficient; reconstructing the edge part through the inverse curvelet transform; keeping the updated texture part and the updated texture part unchanged; calculating a correction value of the edge part; conducting local discrete cosine transform on the correction value of the edge part; conducting soft threshold processing on the transform domain coefficient; and reconstructing the edge part through local discrete inverse cosine transform; updating the threshold; and when the threshold is less than or equal to the step length, the texture part is the texture component map, the smooth part is the smooth component map, and the edge part is the edge component map.

9. An electronic device, comprising: a processor and a memory, wherein the processor is connected with the memory;

the memory is used for storing programs;

the processor is used for running the programs stored in the memory, and executing the method in claim 1.

* * * * *